Oct. 4, 1960   H. E. COOTES ET AL   2,954,599
LEAD MAKING APPARATUS
Filed Sept. 18, 1956   12 Sheets-Sheet 1
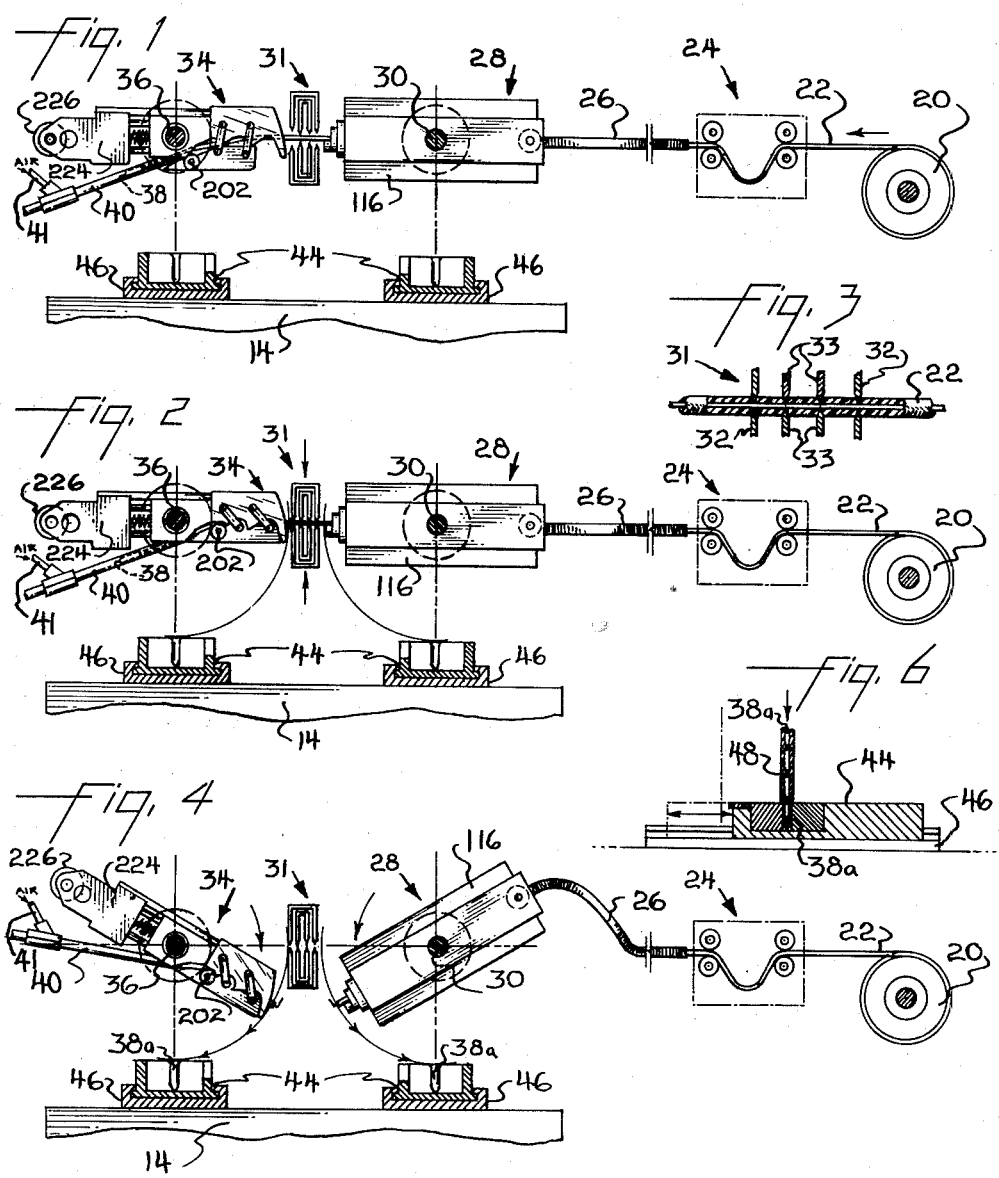

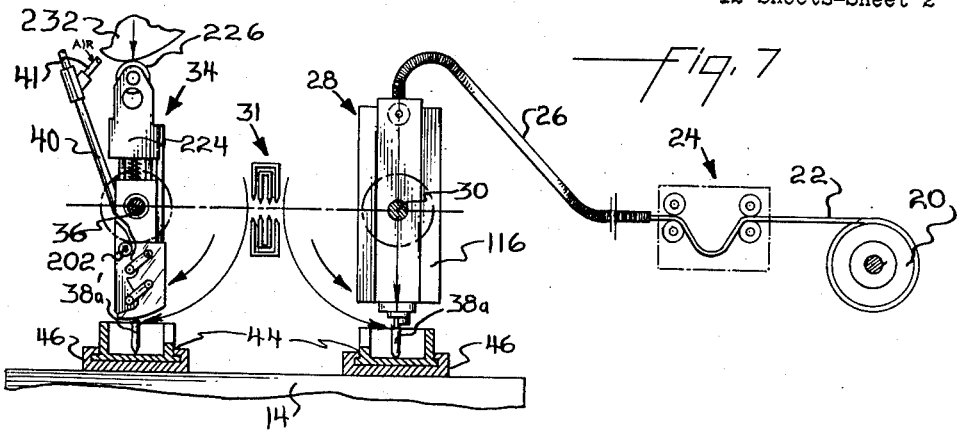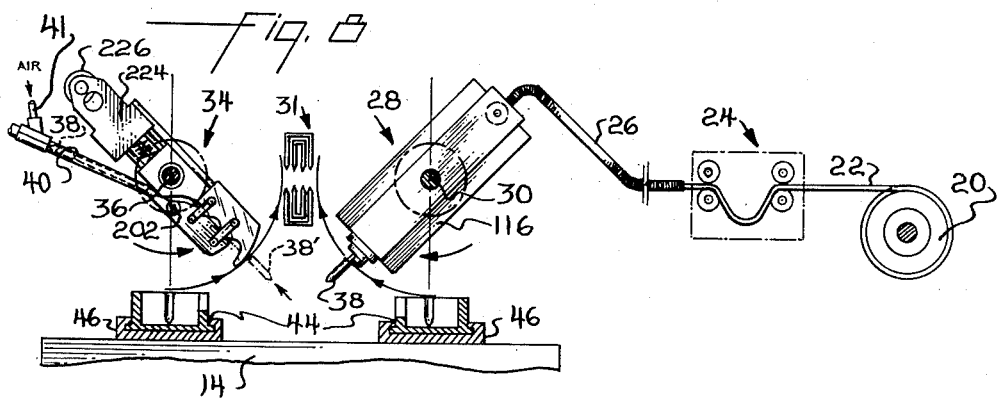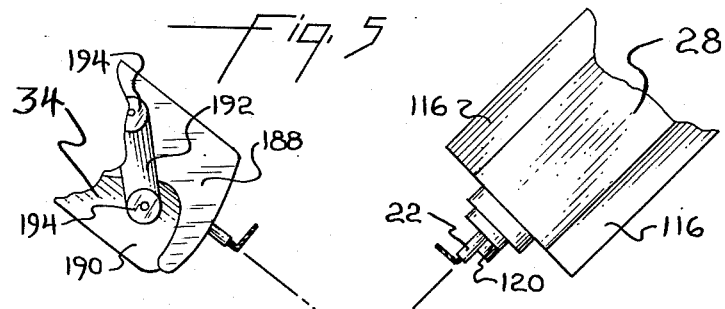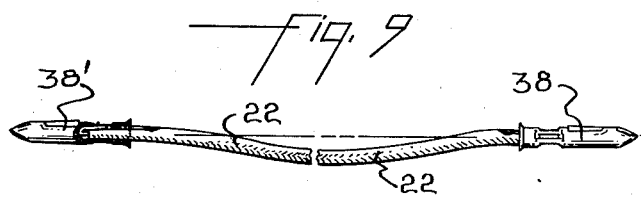

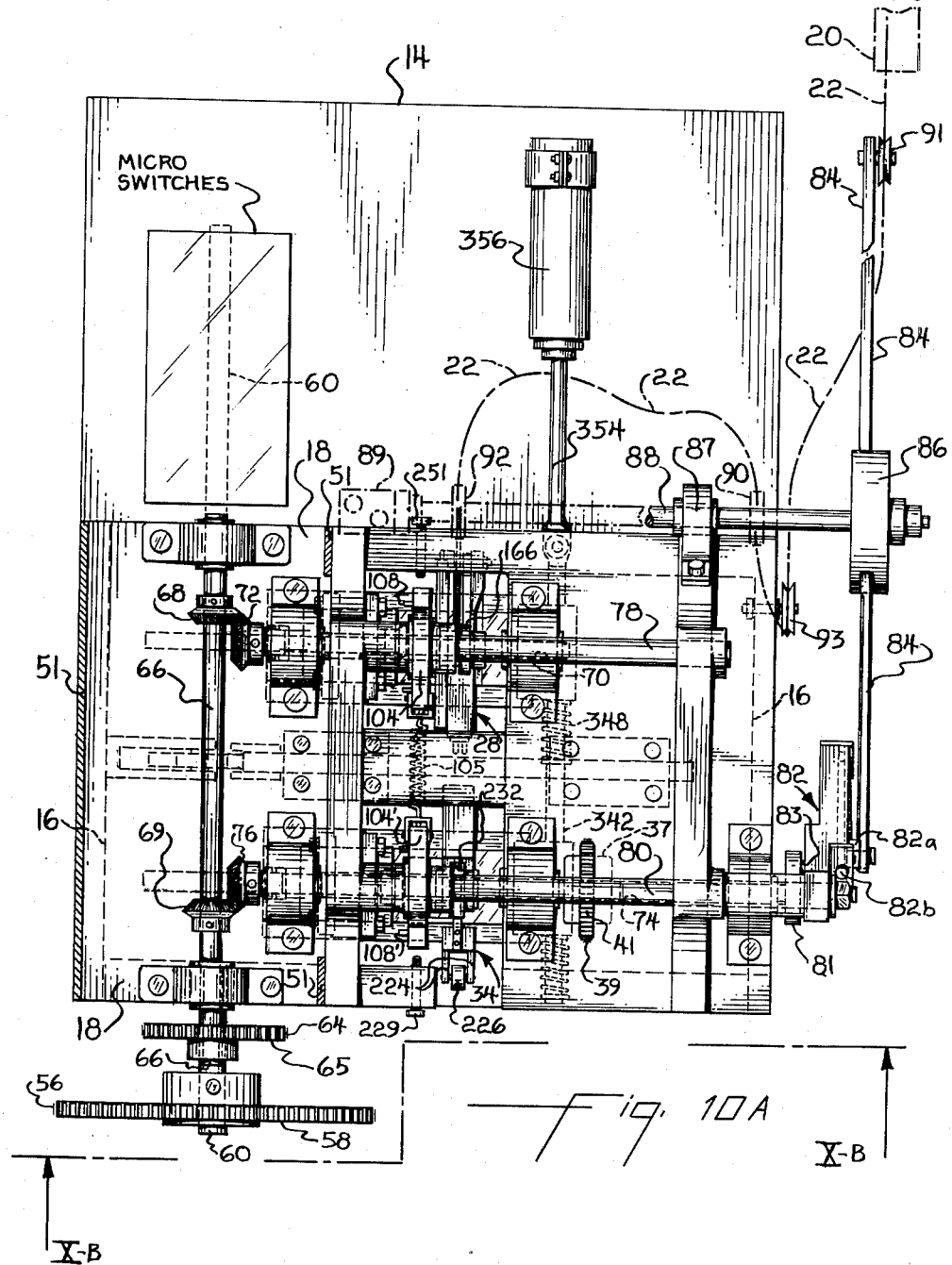

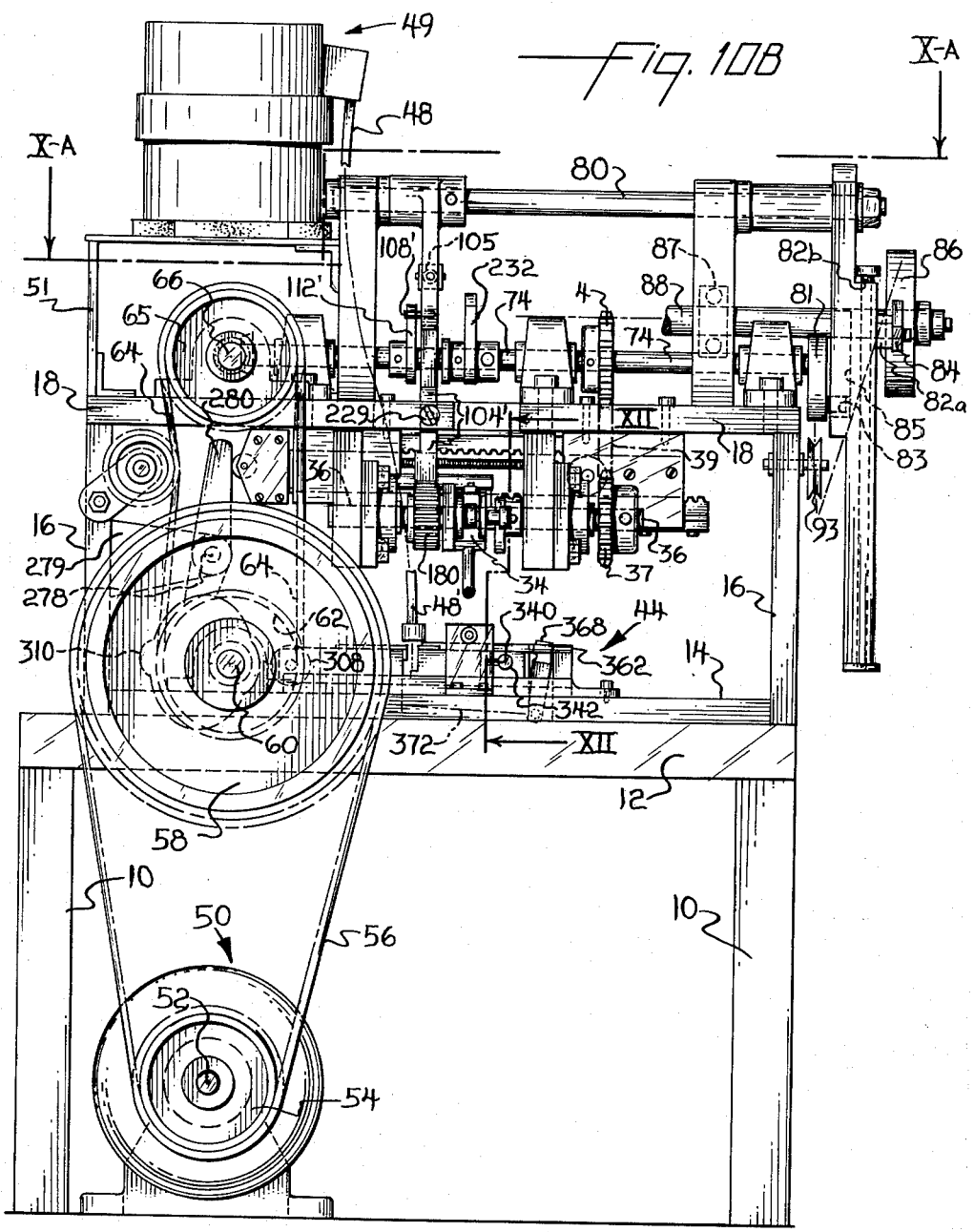

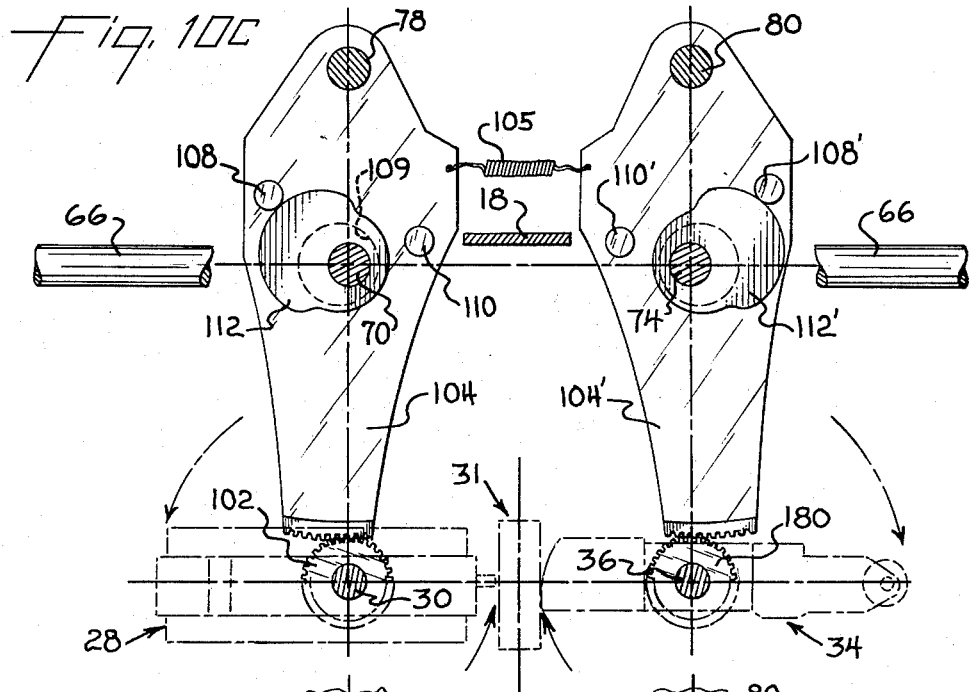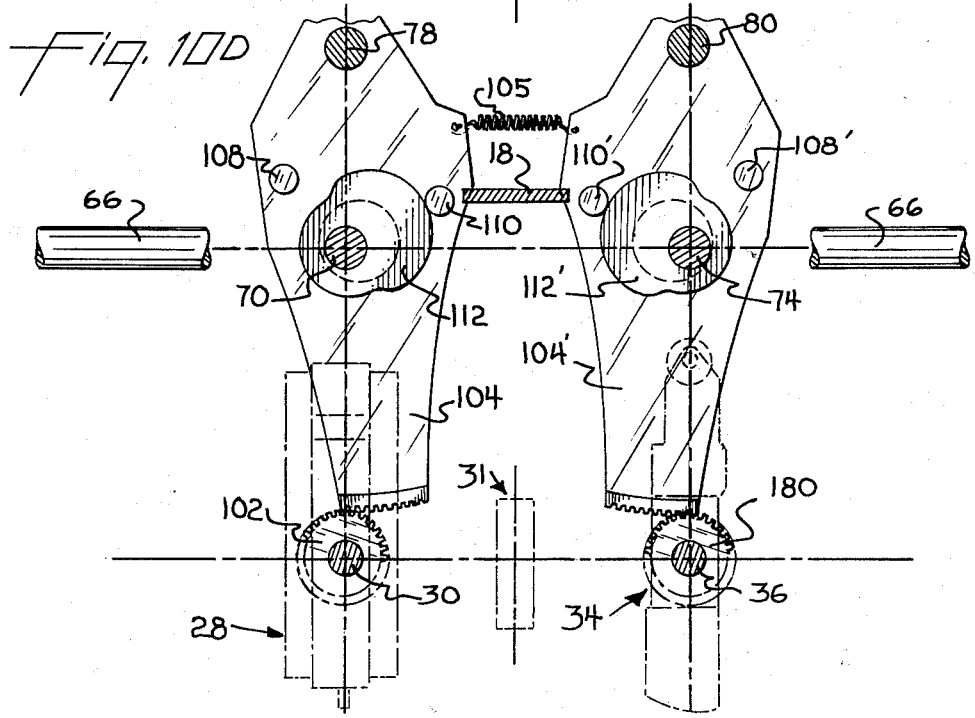

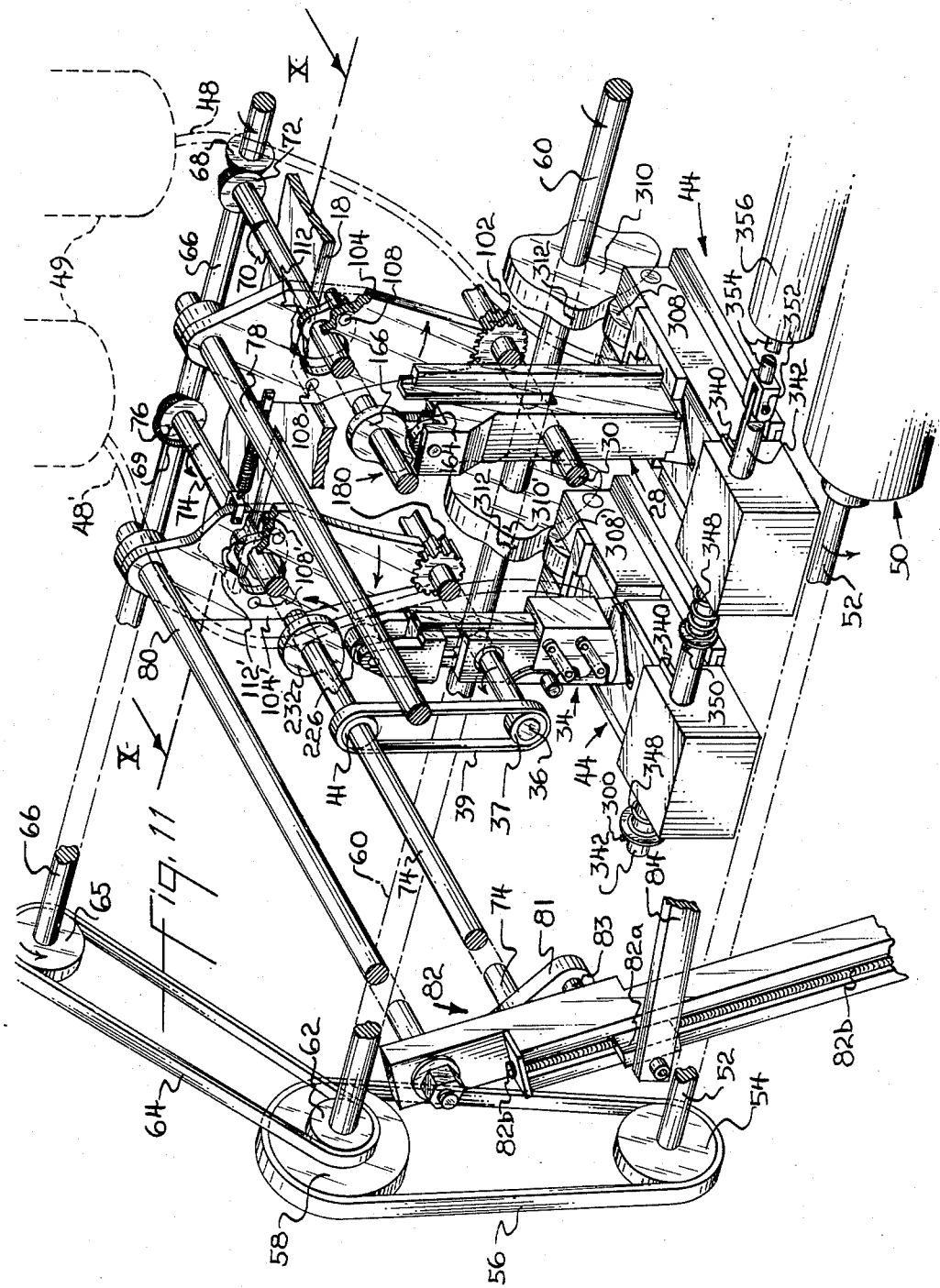

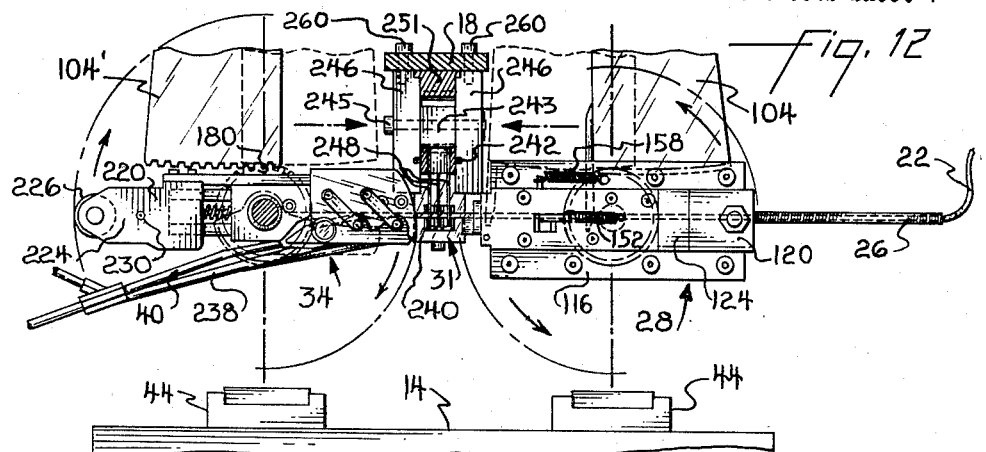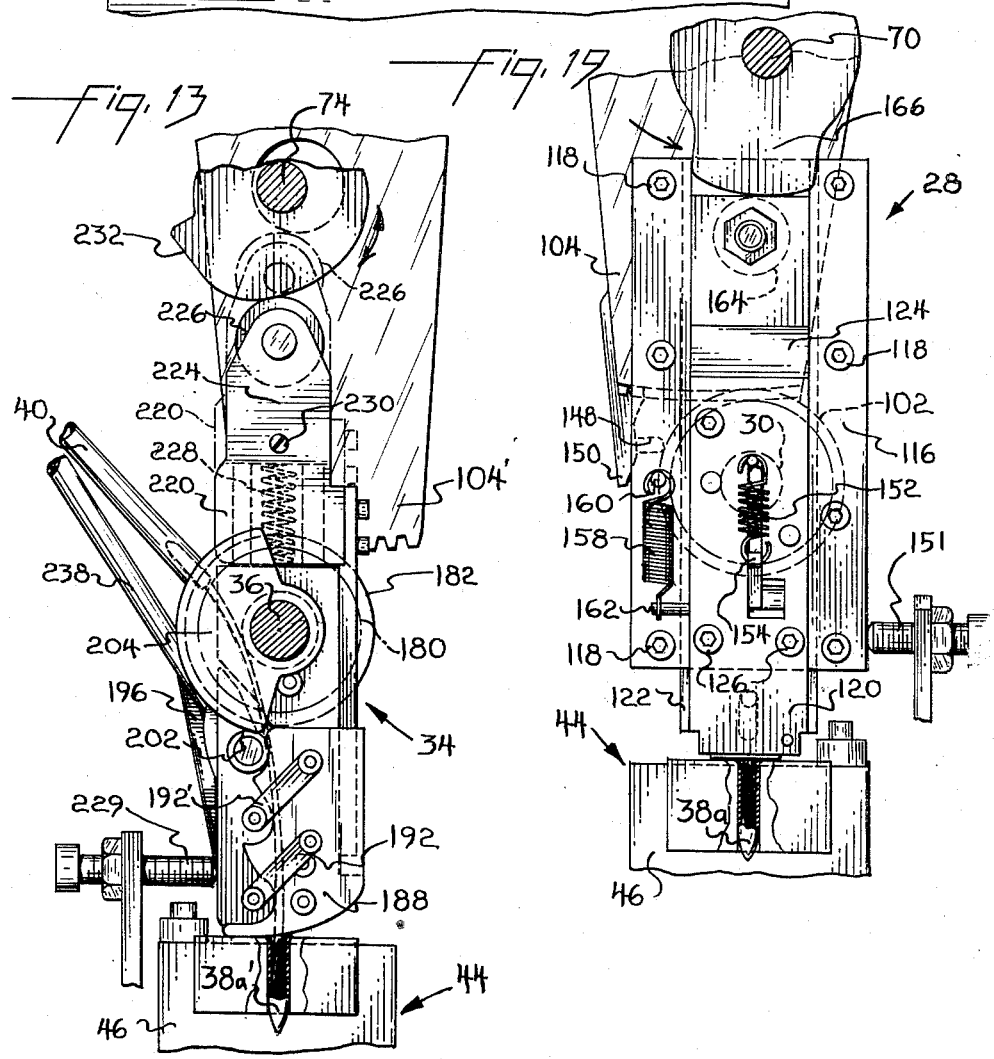

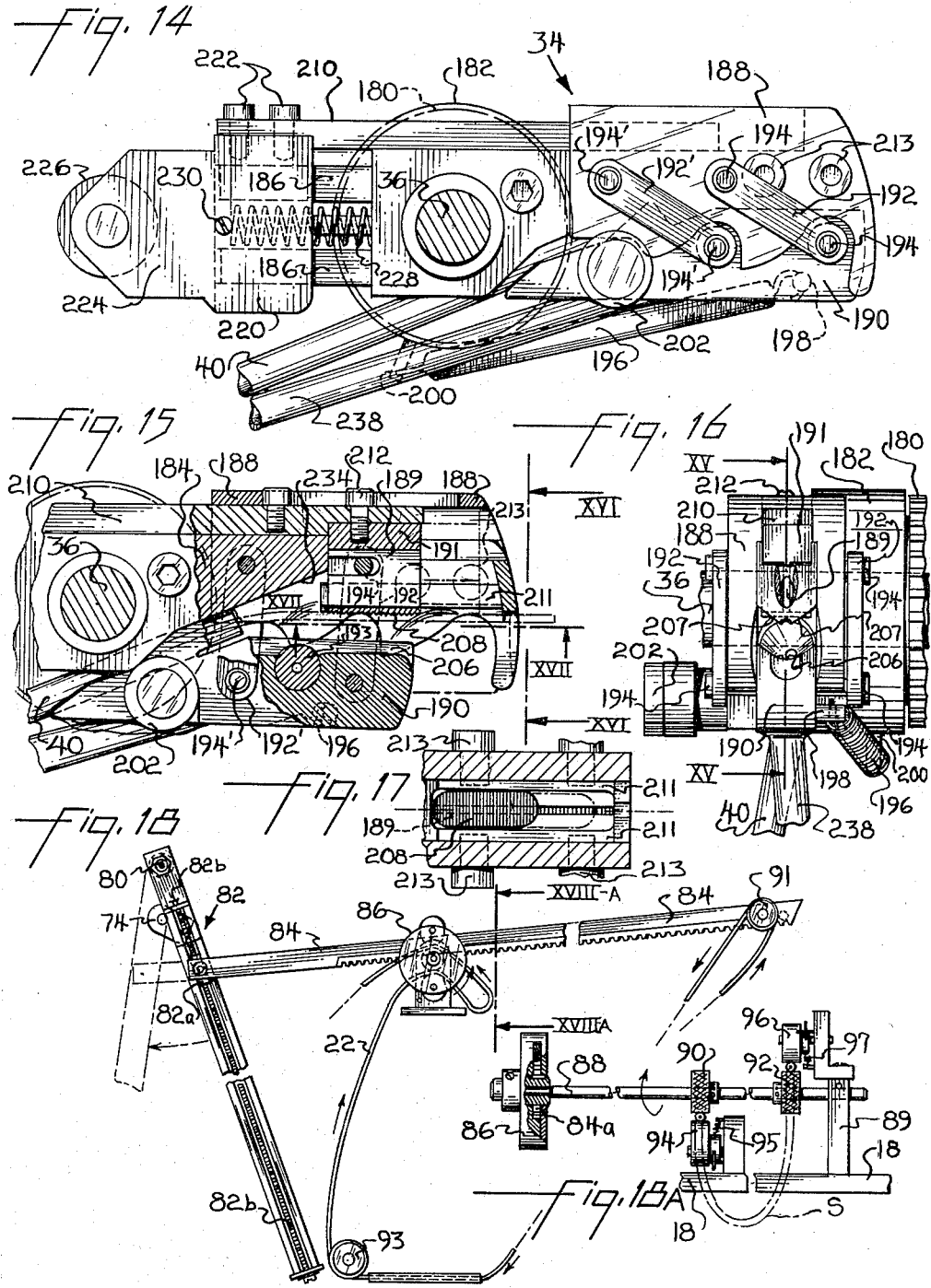

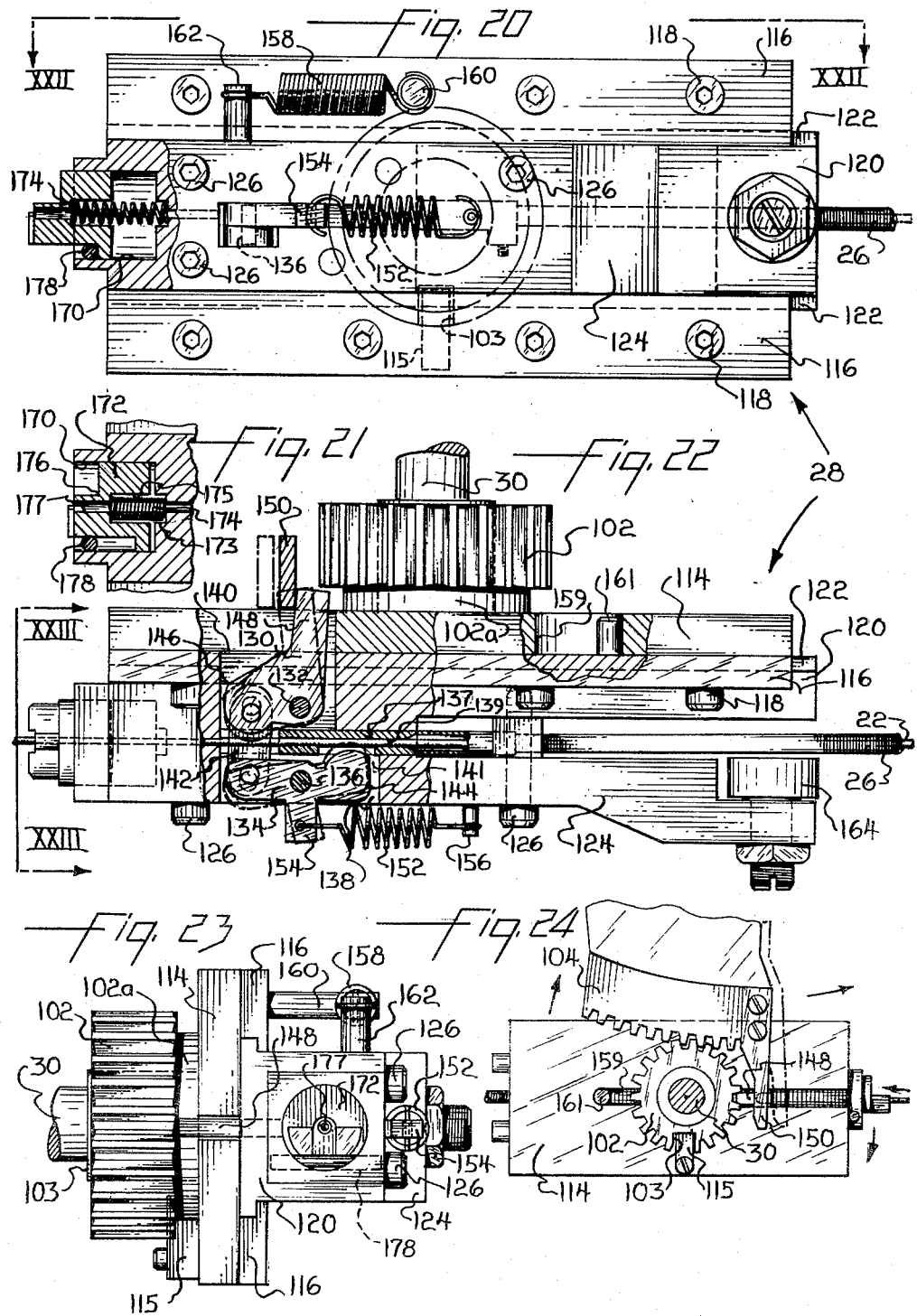

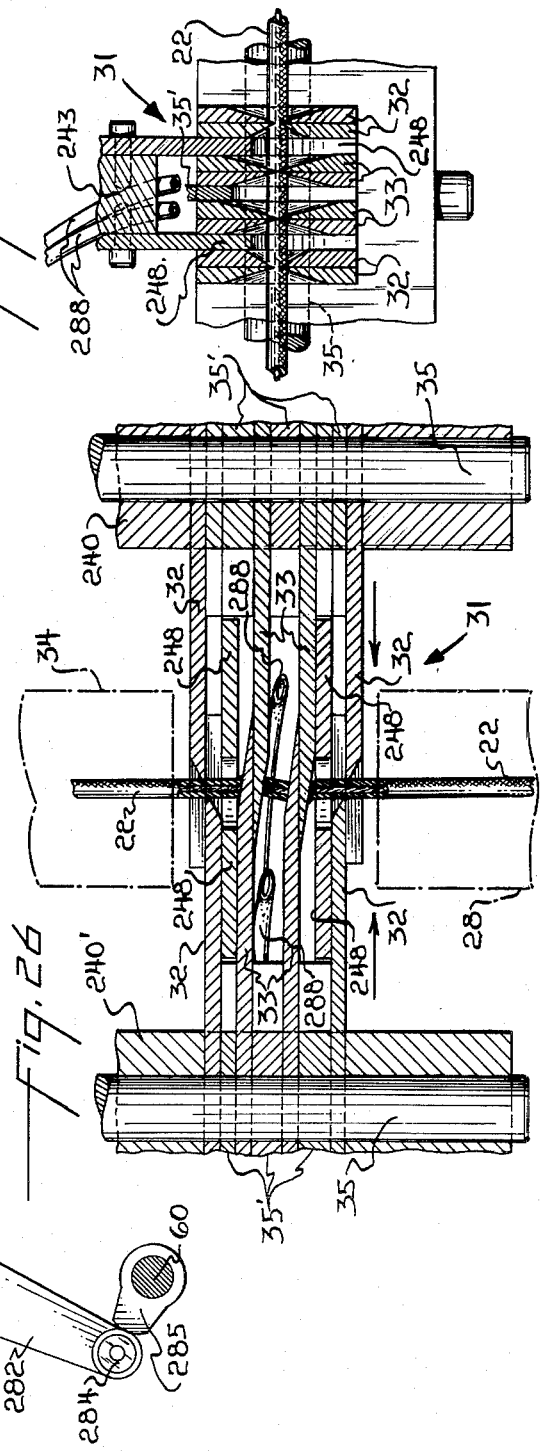

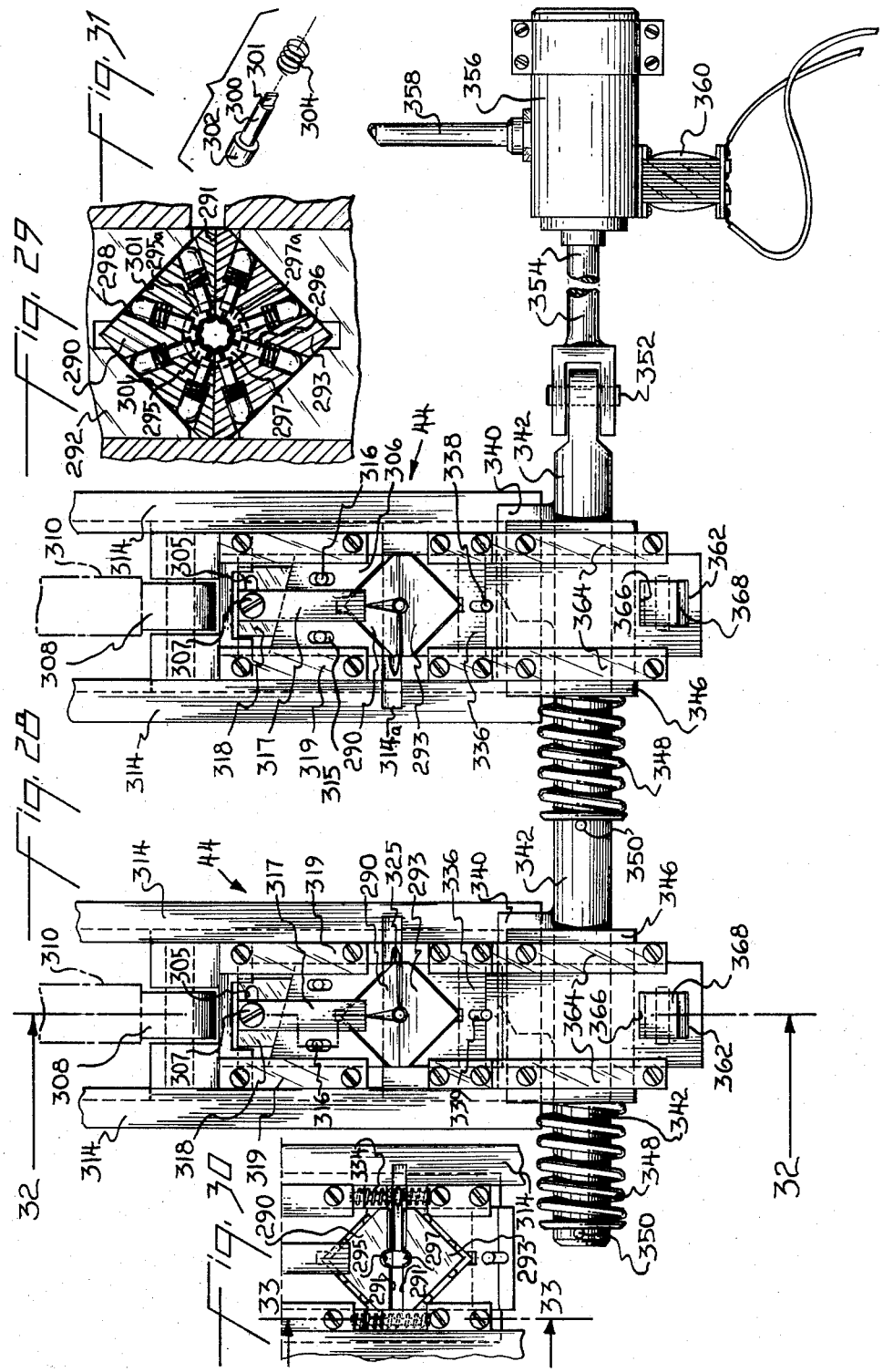

Oct. 4, 1960
H. E. COOTES ET AL
2,954,599
LEAD MAKING APPARATUS
Filed Sept. 18, 1956
12 Sheets-Sheet 12
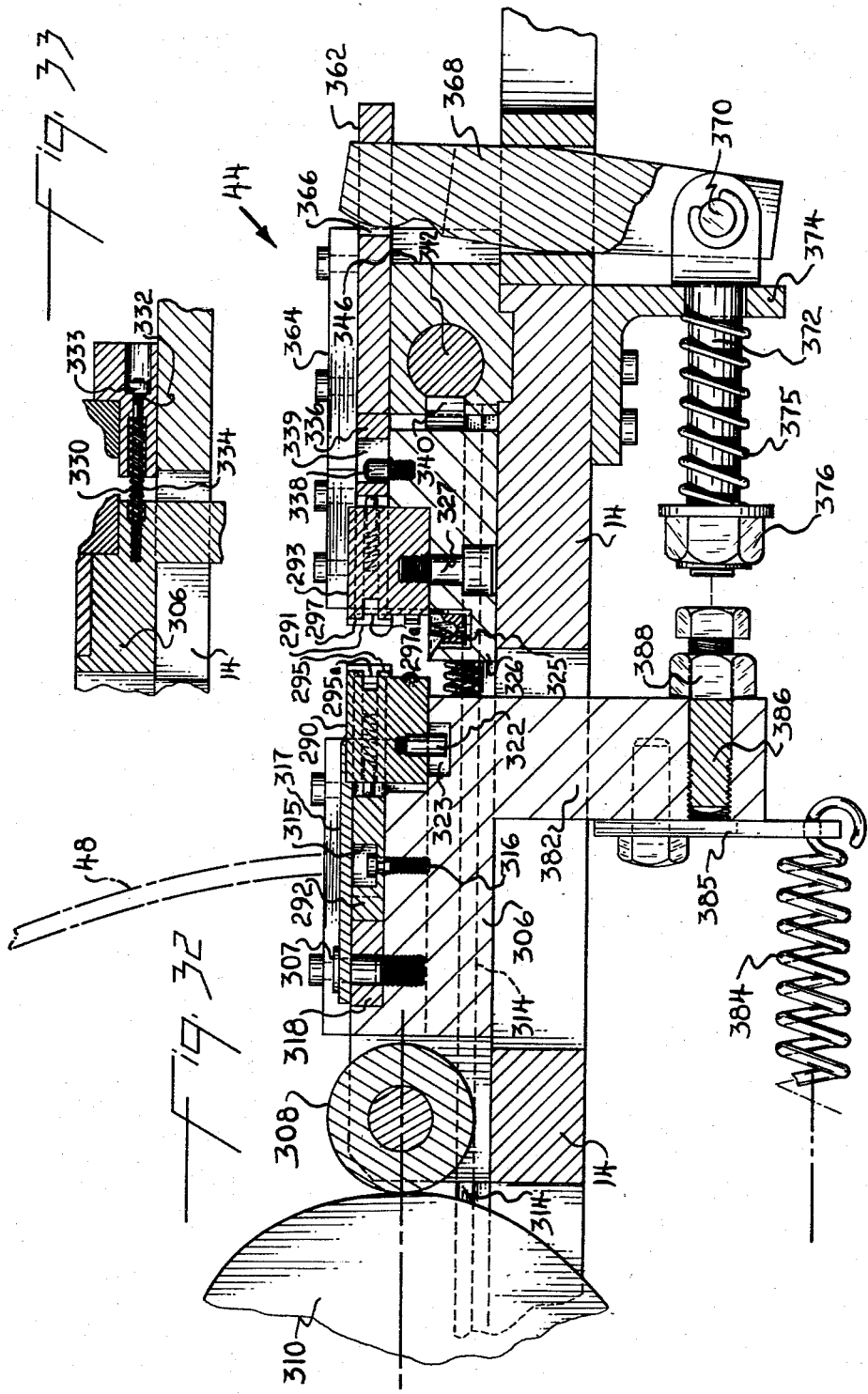

United States Patent Office 2,954,599
Patented Oct. 4, 1960

2,954,599

LEAD MAKING APPARATUS

Harold E. Cootes and Earl E. Folkenroth, Paxtang, Henry F. Fortna, Palmyra, Glenwood A. Fuller, Hershey, and Robert Ullman, Harrisburg, Pa., assignors to AMP Incorporated, a corporation of New Jersey Filed Sept. 18, 1956, Ser. No. 610,614

11 Claims. (Cl. 29—33)

This invention relates to electrical lead making apparatus.

Automatic lead making machines are commonly known to the art which are capable of producing, from a coil or other endless source of wire, leads of a given length having insulation piercing type terminals crimped onto one or both ends thereof. These machines are fully automatic in the sense that the wire is automatically fed and cut to the desired length, and the terminals are automatically fed and crimped onto the wire. These machines, as exemplified by the U.S. patent to Quentin Berg No. 294,808 are not, however, capable of stripping insulation from the lead ends and are limited, as noted above, to the production of leads having insulation piercing type terminals on their ends. Other automatic lead making machines are capable of producing leads having the insulation stripped from one or both ends thereof and having a terminal crimped onto one stripped end.

Neither type of machine described above is capable of producing leads having insulation stripped from both ends and having a terminal, of the type adapted to be crimped onto a stripped conductor end, crimped onto each end thereof. In the past it has been common to produce leads of this type by means of two or more machines, such as a separate wire cutting and stripping machine and a separate crimping machine and this type of lead making process usually involves one or more manual operations. Very often the wire cutting and stripping operations are performed automatically and the subsequent crimping operation is performed by manual insertion of the stripped ends of the leads into the terminals for the crimping operation consequently, the provision of a fully automatic lead making machine is a recognized desideratum in the art.

An additional desideratum in the art of lead making machines is that of providing a fully automatic machine capable of producing leads having terminals of the so-called "closed barrel" type crimped onto the ends thereof. Such closed barrel terminals provide an enclosed or hollow cylindrical portion into which the end of the conductor is inserted prior to crimping. A commonly known alternative type of terminal, the "open barrel" type provides, in one form, a generally U-shaped barrel-forming portion within which the wire is positioned prior to crimping. It can be appreciated that it is somewhat difficult to axially align the end of a conductor and a closed barrel terminal and thereafter insert the end of the conductor into the closed barrel, particularly if the conducting core is of the multi-standard type and if the end thereof has been stripped of its insulation. When this operation is attempted one or more of the strands frequently miss the terminal barrel resulting in a connection of inferior properties. By comparison, it is less difficult to position the end of a conductor in the U-shaped portion of an open barrel type terminal.

It is an object of the present invention to provide an apparatus for producing electrical leads having the insulation stripped from each end thereof and having a terminal crimped onto each end thereof.

A further object is to provide an apparatus for producing leads having terminals of the closed barrel type crimped onto each end thereof.

A further object of the invention is to provide a lead making apparatus for automatically feeding a length of wire, cutting a lead from the end thereof, stripping insulation, and crimping terminals to produce leads having terminals crimped onto each of their stripped ends.

These and other objects of the invention are accomplished by the provision of intermittently actuated wire feeding means which feeds wire from a coil or other substantially endless source through a set of wire severing and insulation cutting blades. Means are provided for closing the wire severing and insulation cutting blades after the wire is fed therethrough and pulling the leading end of the wire and the trailing end of the lead from the closed blades thereby to strip the insulation from the leading end and trailing end of the wire and lead respectively. Also provided are means for positioning the stripped leading end and trailing end within terminals fed by automatic feeding means and for crimping the terminals onto the stripped ends. Ejecting means is provided which, shortly after the completion of the crimping operation, ejects the finished lead from the machine after which the operating cycle is repeated.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

Figures 1 through 8 are schematic views of some of the essential elements of the apparatus embodiment of the invention and showing the sequence of operations in the production of leads in accordance with the invention;

Figure 9 is a view of a lead produced by the herein disclosed embodiment of the invention;

Figure 10A is a top-plan view of a preferred apparatus embodiment of the invention;

Figure 10B is a side view of the embodiment of Figure 10A taken along the line X–B—X–B;

Figures 10C and 10D are fragmentary views, taken along the line X—X of Figure 11, which illustrate the oscillation of gear sectors and conductor carriers which form part of the invention;

Figure 11 is a perspective view, with parts broken away, of some of the components of the apparatus showing the manner in which the various power shafts and cam shafts are interconnected and the location of some of the cams, gears, and other moving parts;

Figure 12 is a fragmentary view, taken along the lines XII—XII of Figure 10B, and showing the wire carrier and the lead carrier and their relationships to the wire severing mechanisms and the crimping mechanisms;

Figure 13 is a fragmentary view showing the lead carrier of the apparatus and illustrating the insertion of the stripped end of the lead into a terminal;

Figure 14 is another view of the lead carrier showing details of the construction thereof;

Figure 15 is a fragmentary view with parts broken away of the frontal section of the lead carrier showing the wire gripping and moving components thereof, this view being taken along the line XV—XV of Figure 16;

Figure 16 is a frontal view of the lead carrier taken along the line XVI—XVI of Figure 15;

Figure 17 is a view taken along the lines XVII—XVII of Figure 15;

Figure 18 is a fragmentary view showing portions of the wire feed mechanism;

Figure 18A is a view taken in the direction of arrow XVIII-A—XVIII-A of Figure 18;

Figure 19 is a view of the wire carrier, which forms part of the apparatus, and illustrating the insertion of the stripped leading end of the wire into a terminal.

Figure 20 is another view of the wire carrier with parts broken away showing details thereof;

Figure 21 is a fragmentary view showing the frontal portions of the wire carrier with the retractable nose thereof in the depressed condition;

Figure 22 is a further view of the wire carrier taken along the line XXII—XXII of Figure 20;

Figure 23 is a frontal view of the wire carrier;

Figure 24 is a side view on a reduced scale, of the wire carrier looking at the opposite side from that shown in Figure 20;

Figure 25 is a view of the wire severing and insulation cutting mechanism which forms part of the apparatus;

Figure 26 is a view taken along the lines XXVI—XXVI of Figure 25;

Figure 27 is a view taken along the lines XXVII—XXVII of Figure 25;

Figure 28 is a plan view of the crimping mechanism which forms part of the apparatus;

Figure 29 is an enlarged sectional plan view of the crimping dies and indentors of the crimping mechanism;

Figure 30 is a fragmentary view showing the crimping dies in the open position;

Figure 31 is a perspective exploded view showing one of the indentors and an associated biasing spring;

Figure 32 is a sectional view taken along the line XXXII—XXXII of Figure 28 showing the relationship of the crimping mechanism to the actuating cams therefor and to the frame upon which it is supported; and Figure 33 is a fragmentary view along the line XXXIII—XXXIII of Figure 30.

In the following description the term "wire" is employed with reference to a substantially endless insulated conductor such as is provided on a reel while the term "lead" is employed with reference to severed sections of the conductor. The term "conductor" is employed in a generic sense to include both wire and lead.

In the interest of facility of disclosure, the method of making leads in accordance with the invention is first described in general terms with reference to the somewhat schematic views of Figures 1 through 8 which show portions of a preferred apparatus of the invention. This generalized description is followed by a particularized description of one satisfactory lead-making installation incorporating the invention and a detailed disclosure of the components of the apparatus.

In Figures 1 through 8, reference numeral 20 denotes a coil of insulated wire 22 which is fed by means of a feed mechanism 24 through a flexible guide tube 26 and through a conductor carrier 28, herein designated as a wire carrier, which is rotatable on a shaft 30. At the beginning of an operating cycle, the wire will extend slightly beyond the end of the wire carrier 28 and will have a terminal 38 crimped thereon. Along the path of wire feed there is provided a wire severing and insulation cutting mechanism 31 comprising a set of insulation cutting blades 32 (Figure 3) and wire severing blades 33 which are intermittently closable by an actuating mechanism (not shown in Figures 1 through 8). Further along the path of wire feed there is provided a second conductor carrier 34, herein designated as a lead carrier, mounted for rotation on a shaft 36. This lead carrier comprises jaw structure, specifically described below, which opens to permit passage of terminal 38 as the wire is fed therethrough and mounts a pneumatic ejector tube 40 to which compressed air is supplied by a line 41 for ejecting a finished lead. At the beginning of an operating cycle, the jaw structure of lead carrier 34 is open and blades 32, 33 are open to permit feeding of the leading end of the wire having a terminal thereon.

Disposed on a bed plate 14 beneath carriers 28, 34 are a pair of crimping mechanisms 44, which are substantially alike. Each crimping mechanism is reciprocable a distance indicated by the arrow in Figure 6 on a track schematically indicated at 46 between a crimping station and a terminal receiving station, the crimping mechanism 44 being shown in its terminal receiving station in Figure 6. An uncrimped terminal 38a is fed to the crimping mechanism at this station from a feed tube 48 which accommodates a succession of the terminals. At the beginning of the operating cycle these crimping mechanisms are in their "back" positions, i.e. at the terminal receiving stations as shown in Figure 6.

The operating cycle of the method and apparatus thus far described is as follows: wire feed mechanism 24 is actuated to draw wire from reel 20 while feeding the leading end having terminal 38 thereon between blades 32, 33, through lead carrier 34 (which is open) and into ejector 40. After the feeding step is completed, the blade sets 32, 33 are closed as shown in Figures 2 and 3, at which time the lead is severed from the end of the fed wire. Thereafter, the lead carrier and wire carrier are rotated from their normal positions of Figure 1 to strip the severed insulation from the trailing end of the lead and from the leading end of the wire (Figure 4). During the portion of the operating cycle described thus far, the crimping mechanisms 44 are shifted to their "front" positions, i.e. to the left from the position of Figure 6, so that an uncrimped terminal within each crimping mechanism will be disposed beneath the carriers 28, 34. The rotation of carriers 28, 34 causes the stripped ends of the conductor to be bent, as shown in the enlarged view of Figure 5 so that the bared ends of the wire and lead extend angularly and nearly normally to the axis of the wire and lead.

The carriers are further rotated until they assume the position of Figure 7 at which time the wire and lead will be substantially axially aligned with the uncrimped terminals in crimping mechanisms 44. The ends of the wire and lead are then inserted into the terminals in a manner described below and the terminals are crimped thereon. Subsequently the carriers are returned to their aligned positions and the complete cycle, beginning the feeding of the wire is repeated. During the return of the carriers, pneumatic ejector 40 is actuated to eject the finished lead.

Turning now to the details of the disclosed apparatus embodiment, in Figures 10A and 10B, the reference numerals 10 and 12 respectively denote the legs and cross members of a stand which supports a bed plate 14 upon which crimping mechanisms 44 are mounted. Side plates 16 extend upwardly from the bed plate and support a top plate 18. As best shown in Figure 10A, bed plate 14 is somewhat wider than top plate 18 and these two plates support the various bearings and other components as described below. In the interest of clarity, these various components are described under separate headings in the paragraphs which follow.

*The power supply*

Referring to Figures 10A, 10B and 11, an electric motor 50, mounted beneath bed plate 14 provides a shaft 52 having a sprocket 54 keyed or otherwise secured to the end thereof. Sprocket 54 is connected by means of a chain 56 to a somewhat larger sprocket 58 keyed to one end of a main power shaft 60, which is suitably journalled in bearings mounted on base plate 14. A sprocket 62 is keyed to shaft 60 adjacent sprocket 58 and is connected, by means of a chain 64, to a sprocket 65 keyed or otherwise secured to a jack shaft 66 mounted in bearings secured to top plate 18. Bevel gears 68, 69 on jack shaft 66 mesh with bevel gears 72, 76 on the ends of cam shafts 70, 74 respectively which cam shafts are journalled in bearings mounted on top plate 18. It will be apparent from Figure 11 that motor shaft 52, main power shaft 60, and jack shaft 66 all rotate in a counter clock-wise direction (as viewed from the right in Figure 11) while cam shaft 70 rotates in a clock-wise direction and cam shaft 74 rotates in a counter clock-wise direction as viewed from the front in Figure 11. The diameter of sprockets 65 and 62 is the same so that jack shaft 66 rotates at the same speed as main drive shaft 60. Also, cam shafts 70 and 74 rotate at the same speed as the jack shaft and the main power since the bevel gears 68, 72 and 69, 76 are the same size. The actual operating speed of the machine will be determined by the speed of motor 50, and the size of sprocket 54 relative to the size of sprocket 58. This actual speed will vary depending upon the particular type of terminal being attached to the leads, however, it can be stated in general that speeds in the order of 40 to 80 revolutions per minute (to produce 40 to 80 finished leads per minute) are satisfactory.

In addition to the rotating shafts described above there are provided a pair of stationary shafts 78, 80 extending transversely across the top of the apparatus and functioning as pivotal mountings for various components of the apparatus as described below.

The wire feed mechanism

The wire feed mechanism 24 for the apparatus as shown in detail in Figures 10A, 10B, 11, 18 and 18A comprises an oscillating arm 82 pivotally mounted on the end of stationary shaft 80 which arm is oscillated by means of a crank arm 81 secured on the end of continuously rotating cam shaft 74. Crank arm 81 provides a cam follower 83 on its end which is received within a groove 85 (Figure 10B) on one side of arm 82 so that as the cam follower is rotated on a circular path by the crank 81, arm 82 is oscillated about its pivot point on the end of shaft 80. On the opposite side of arm 82 from the groove which accommodates cam follower 83 there is provided a threaded rod 82b which is rotatably mounted within a slot in the arm. Rod 82b accommodates a threaded sleeve 82a to which is pivoted a reciprocable rack bar 84. Thus, for a given amplitude of oscillation of arm 82, the travel of rack bar 84 can be varied by merely changing the position of sleeve 82a. Rack bar 84 engages a gear 84a in an over-running clutch 86 on a shaft 88. Over-running clutch 86 is substantially similar to the over-running clutch shown on Figures 12 and 13 of the U.S. patent to Quentin Berg No. 2,688,133 and therefore need not be described in detail here. It is sufficient to say that as rack bar 84 is moved to the left in Figure 18 clutch 86 will be engaged to rotate shaft 88 while rightward movement of rack bar 84 does not rotate shaft 88 so that this shaft is stationary during the return movement of the rack bar.

Shaft 88 is journalled at its end in a support 89 and intermediate its ends in a bearing 87 and accommodates a pair of feed wheels 90, 92 which are secured to the shaft for rotation therewith. The insulated conductor is drawn over a pulley 91 on the end of rack bar 84 by the motion of the rack bar and over a pulley 93 from whence it passes between the underside of feed wheel 90 and an eccentrically mounted pressure wheel 94 which is maintained firmly against the conductor by virtue of a spring 95 so that as wheel 90 rotates in the direction of the arrow of Figure 18A, the conductor will be fed forwardly to produce the slack indicated by the letter S. The conductor extends from this slack section over the top of feed wheel 92 and is fed into the plane of the paper in Figure 18A by virtue of the effect of this feed wheel. An eccentrically mounted pressure wheel 96 biased by a spring 97 and similar to pressure wheel 94, is provided on the top of bracket 89 for the purpose of pressing the conductor between feed wheel 92 and pressure wheel 96. As with over-running clutch 86, the feed mechanisms comprising the feed wheels and eccentrically mounted pressure wheels are substantially similar to the corresponding components shown in the aforementioned patent to Quentin Berg and need not be described in detail here. It should be pointed out however that a pair of feed wheels in side-by-side relationship are employed as shown to produce the slack S in the fed wire which goes to the apparatus for the reason that it has been found that inconsistent feeding results where only one feed wheel is used depending upon the tension of the wire coming from the reel which in turn is dependent upon the weight of the reel or spool of wire and the amount of wire it carries. With the arrangement shown in Figure 18 a sufficient quantity of slack can be initially produced between the two feed reels and a consistently equal quantity of wire will be fed to the apparatus.

From the foregoing description it will be apparent that for every rotation of cam shaft 74, rack bar 84 will be reciprocated once and wire will be fed during a portion of the stroke of this rack bar. Thus wire is not fed during a full 180° of rotation of cam shaft 74 but is only fed during a portion of a complete revolution of this shaft. This limited feeding interval is accomplished by virtue of the relative position of the pivot point of crank arm 81 relative to the pivot point of oscillating arm 82.

The amount of wire fed during the feeding interval, and the length of the leads produced, can readily be changed either by changing the position of threaded sleeve 82a on rod 82b or by replacing driven feed wheels 90, 92 with wheels of larger or smaller diameter. For example, if sleeve 82a is moved relatively away from shaft 80 by rotation of rod 82b, the travel of rack bar 84 is increased and the amount of wire fed is increased while movement of this sleeve toward shaft 80 decreases the amount of wire fed. If feed wheels 90, 92 are replaced by wheels of larger diameter, the amount of wire fed will be increased while substitution of smaller wheels will decrease the amount of wire fed. It will be apparent that a wide range of lead lengths can be produced by virtue of these two methods of adjusting the wire feed.

The wire carrier

Referring now to Figures 10C, 10D, 11 and 19–22 shaft 30 is mounted on suitable bearings secured to the machine frame and accommodates for free rotation thereon a gear 102 providing a notch 103 and an integral spacer 102a. A plate 114, also mounted freely on the shaft, provides a key 115 which enters notch 103. Notch 103 is slightly oversized relative to key 115 so that limited rotation of the gear is permitted relatively to the plate although beyond the range of this limited rotation, rotation of gear 102 will cause plate 114 also to be rotated. A pair of guide plates 116 are secured to plate 114 by fasteners 118 to form a set of rails within which a slide member 120 is received for sliding movement relative to plate 114 from right to left as viewed in Figure 22. Slide member provides a pin 161 which is received within a slot 159 in base 114 and also provides flanges 122 which fit within overhanging portions of guide plates 116 so that the parts are retained in assembled relationship while permitting limited sliding movement of the slide member as described below. A cover 124 is provided on slide member 120 which cover is secured thereto by means of fasteners in the form of bolts 126. A plate 137 is positioned between cover 124 and slide member 120 and is bored to provide a passage 139 through which the wire travels during the feeding operation.

Slide member 120 is cut away as shown at 140 for the accommodation of a bell crank 130 and cover member 124 is cut away as shown at 138 for the accommodation of a double crank 134. These cranks 130, 134 are pivoted at 132 and 136 to slide member 120 and cover member 124 respectively and constitute a lock for the purpose of locking the wire relative to the sliding part of the wire carrier as will be apparent from the description which follows.

Lever 130 provides an arm 146 to which is pivoted a link 142, which link extends through an opening in plate 137 and is pivoted at its opposite end to one of the arms of double crank 134. Another arm 154 of crank 134 is connected to a spring 152 which is anchored to cover plate 124 by means of a pin 156 so that the crank 134 is normally biased in the position shown in the broken lines of Figure 22. Crank 134 provides an arm 144 providing a locking surface which normally extends through an opening 141 in plate 137 so that when this crank 134 is in the position shown by the broken lines in Figure 22 the conductor 22 is pressed against the side of plate 137 thereby to lock this conductor against axial movement within the plate. Arm 146 of crank 130 also locks the conductor against the side of the plate when this arm is in the position shown by the broken lines of Figure 22. An additional arm 148 of bell crank 130 extends through a slot provided in plate 114 which arm 148 controls locking and unlocking of the wire within the wire carrier. The parts are shown in the solid line positions of Figure 22 with the wire in the unlocked position, however it will be apparent that as arm 148 of lever 130 is moved to the left in Figure 22 (or to the right in Figure 24), the contractile tendency of spring 152 causes the crank 134 to pivot about point 136 so that arm 144 enters passage 137 through slot 141 to lock the wire against the plate 137. This pivotal movement of crank 134 causes pivoting of crank 130 around its pivot 132, by virtue of link 142, and arm 146, of this crank thereby to lock the wire against plate 137 at an additional point.

Movement of arm 148 is controlled by finger 150 which is secured to and depends from a gear sector 104. This gear sector provides teeth on its lower end which mesh with the teeth of gear 102 and is pivoted at its upper end on stationary shaft 78. Periodic oscillatory motion is imparted to a sector 104 by means of a pair of cam followers 108, 110 mounted on the central portion of this gear sector. These followers are intermittently contacted by a cam 112 mounted for rotation with shaft 70 which shaft extends through an oversized opening 109 in sector 104. It will be apparent from Figure 11 that as gear sector 104 is oscillated by the action of cam 112 wire carrier 28 is oscillated from a horizontal position as shown in Figure 1 to a vertical position as shown in Figure 7. Also, when the gear sector is in the position shown in Figures 22 and 24, finger 150 will bear against arm 148 of crank 130 to unlock the wire from the wire carrier by movement of bell crank 130 and double crank 134.

It will thus be apparent that when wire carrier 28 is in the horizontal position, sector 104 will be in the position shown in Figure 24 and the wire will be unlocked. As this sector is moved in the direction of the arrow by the action of cam 108, initially there is some rotary movement of gear 102 as finger 150 is disengaged from arm 148 of bell crank 130. This initial movement of sector 104 is not sufficient to cause rotary movement of the wire carrier from its horizontal position because of the lost motion connection between groove 103 and keyway 115 although it is sufficient to disengage finger 150 from arm 148 thereby to cause locking of the wire. Thereafter, and upon further rotation of sector 104, the lost motion is taken up in notch 103 and the wire carrier is swung from the position of Figure 24 in the direction of the arrow of Figure 24 to the vertical position until it comes to rest against stop 151. By virtue of this arrangement, when the wire carrier is in the horizontal position (Figure 1) the locking mechanism for the wire (i.e. cranks 130, 134) is open and the wire can be fed through the carrier. At the completion of the wire feeding stage of the operating cycle, the wire is securely locked within the wire carrier and the carrier is thereafter rotated from the position of Figure 1 to the position of Figure 7. As explained below in the description of the wire cutting and insulation severing mechanism it is during this rotation of the carrier that the insulation is stripped from the leading end of the wire and it is for this reason that locking of the wire is necessary.

The front end of cover member 124 provides bore 170 axially aligned with the passage in plate 137 and this bore accommodates a depressible nose 172. This nose is normally biased outwardly by means of a compression spring 174 which is received with a recess 175 in nose 172 and which also enters a recess 173 in cover member 124. A passage 177 is provided in the nose for the accommodation of the wire which passage is in alignment with the axis of spring 174. Also, a passage in cover 124 is axially aligned with spring 174 and passage 177. It will thus be apparent that in traveling through the wire carrier, the conductor 22 enters the carrier from flexible tube 26, extends through passage 139 in plate 137, extends through the passage in cover plate 124, through spring 174, and through the passage 177 in nose 172.

Nose 172 is normally biased in the position of Figure 20 although it can be depressed to the position of Figure 21 against the force of spring 174. It should be noted that nose 174 is cut away as shown at 176 for reasons which will be apparent from the description which follows. A key 178 contained within cover 124 prevents fall out of nose 172 while permitting reciprocation or depressing of the nose as shown in Figures 20 and 21.

A cam follower 164 is mounted on the end of cover 124 opposite from the end in which nose 172 is mounted which cam follower is engaged by a cam 166 mounted for rotation on and with shaft 70. When the nose is in the vertical position of Figure 19, cam 166 moves cover 124 and slide member 120 downwardly as viewed in Figure 19 to effect insertion of a stripped wire end into a terminal as described below. However it should be mentioned that as the slide member 120 and cover 124 (which move as a unit relatively to a base plate 114) are moved downwardly as viewed in Figure 19, by the action of cam 66, nose 172 is forced to retract against the compression of spring 174. As this takes place the wire, which is locked within the wire carrier by cranks 134, 130, is moved downwardly relative to plate 114 and inserted into a previously positioned terminal 38.

Slide member 120 and cover member 124 are biased to the position shown in Figures 20 and 22 by virtue of a spring 158 anchored at one end to a pin 160 on one of the guide plates 116 and anchored at the other end to a pin 162 integral with cover member 124. Cam 166 must, of course, overcome the force of this spring 158 during the inserting operation described above.

*The lead carrier*

Referring now to Figures 10C, 10D, 11 and 13-17, it can be seen that lead carrier 34 is integral with a gear 180 mounted freely on a shaft 36 and engaged by a gear sector 104' which is substantially similar to sector 104 and will not be described in further detail at this point. These sectors are connected and biased towards each other by means of a spring 105 which normally aids in maintaining the wire carrier and lead carrier in their aligned positions. Sector 104' is mounted on stationary shaft 80 and is oscillated against the force of spring 105 by means of a cam 112' mounted on cam shaft 74 which cam engages followers 108', 110'. Gear 180 is integral with a spacer 182 which in turn is secured to frame 184 of carrier 34. Shaft 36 extends through this frame as shown best in Figure 16, however the frame is not secured to the shaft but is freely movable or rotatable thereon. Shaft 36 is rotated continuously by means of a sprocket or pulley 37 on one end thereof which is connected through a chain 39 to a sprocket 41 on cam shaft 74. The purpose of providing a continuously rotating shaft for the lead carrier which shaft does not rotate with the lead carrier will be apparent from the description below of the manner in which the lead is gripped.

Frame 184 of the lead carrier provides a pair of extensions 186 on one end thereof and accommodates on the other end an upper jaw or fixed jaw 188. This upper jaw generally covers the front end of the lead carrier (i.e. the right-hand end as shown in Figure 15) and is hollow internally for the purpose of accommodating the various lead gripping and moving components described below. This upper jaw, as mentioned above, is fixed relative to the carrier frame 184 while a lower jaw 190 is movable relative to the carrier frame into and out of engagement with the upper jaw. The two jaws 188, 190 are connected by pairs of parallel links 192, 192' and pins 194, 194'. It will be noted that the pin 194' extends through lead carrier frame 184 and through the sidewalls of upper jaw 188 thereby fixing the position of the upper jaw relative to this lead carrier frame. A pin 198 is secured to the lower jaw and accommodates one end of a coil spring 196 which is anchored at its opposite end to a pin 200 mounted on spacer 182. This spring normally maintains lower jaw 190 in its opened position, as shown in Figure 15, but permits closure of the lower jaw as shown in Figure 14 when a cam 204 (Figure 13) mounted on shaft 36 for rotation therewith contacts a cam follower 202 on the lower jaw. It will be apparent from inspection of cam 204 that the lower jaw is closed against the upper jaw during a portion of the rotation of shaft 36 and is opened at other times. As emphasized above, the lead carrier is not secured or keyed to shaft 36 but is mounted for rotation thereon. The arrangement shown thus utilizes shaft 36 and cam 204 for effecting closure of the jaws and at the same time utilizes this shaft as a bearing for the lead carrier to permit swinging from the horizontal position of Figure 1 to the vertical position of Figure 7.

The lower jaw at its end provides a concave or dished portion 206 through which the leading end of the wire travels during the wire feed cycle. When the jaw is closed this dished portion is urged against a complementary surface 207 on the front end of a guide block 211 which guide block is secured between the depending sidewalls of the upper jaw by means of fasteners 213. The lower jaw also provides a roller 193 which, when this jaw is closed, is positioned adjacent a pawl or shoe 208 (described below) for the purpose of gripping the conductor.

Frame 184 of the lead carrier provides a sloping surface 234 which guides the lead into ejector tube 40 which, when the jaws are opened as in Figure 15, lies substantially parallel against the sloping surface. The ejector tube itself is mounted on the lower jaw for movement therewith, a brace or support 238 being provided in the disclosed embodiment for the purpose of rigidifying this ejector tube. It will also be apparent from Figure 8 that air is supplied to the ejector tube from an air line 41 for the purpose of ejecting finished leads at the end of the operating cycle.

A pawl or shoe 208 having a serrated surface is contained between the sidewalls of upper jaw 188 and provides a web portion 189 which extends through an elongated slot in guide member 211 for reciprocation therein. This web portion is itself slotted as shown in Figure 15 for the accommodation of pin 194. Web 189 is integral at its upper end (as viewed in Figure 15) with a block portion which in turn is secured by a suitable fastener 212 to a reciprocable rod 210. This rod extends along the frame 184 and is secured at its opposite end by means of fasteners 222 to a carrier head 220. The carrier head itself is reciprocable on projections or extensions 186 and provides a pair of ears 224 on its end between which is mounted a cam follower or roller 226. A coil spring 228 positioned between the two projections 186 bears at one end against frame 184 and at the other end against a screw fastener 230 in carrier head 220 which fastener functions as a retainer for the spring. It will be obvious that this spring normally biases the carrier head to the left as viewed in Figure 14 but that the carrier head can be moved against the compression of this spring. Such motion of the carrier head is effected by means of a cam 232 mounted on shaft 74 when the lead carrier is in the vertical position of Figures 7 and 13. As this cam pushes carrier head 224 downwardly (as viewed in Figure 13) relative to the frame of the lead carrier, rod 210 is also pushed downwardly and this in turn urges or pushes pawl 208 toward the end of the lead carrier. At this time, since the lead is partially gripped by the closed jaws, the stripped end of the lead is pushed downwardly, as viewed in Figure 13, into the previously positioned terminal 38 as shown in Figure 13.

In the operation of the apparatus the lead carrier at the beginning of the operating cycle is in the position of Figure 1 of the drawing with the lower jaw disengaged from the upper jaw. While the jaws are thus opened, the leading end of wire 22 from the reel having a terminal attached thereto (from the previous operating cycle) is fed through and between the jaws and down into the ejector tube 40 to the position of Figure 2. Thereafter cam 204 engages cam follower 202 to urge lower jaw 190 into its closed position against upper jaw 188 to grip the fed length of the conductor between pawl 208 and the lower jaw. After the conclusion of the feeding cycle the wire cutting and insulation severing mechanism is actuated, as described below, to sever a lead. The entire lead carrier structure is then swung from the horizontal position to the vertical position by the action of cam 112' and gear segment 104 during which time insulation is stripped from the end of the lead. After the lead carrier arrives at the vertical position of Figure 13, it comes to rest against an adjustable stop 229 and cam follower 226 is engaged by cam 232 to actuate pawl 208 thereby to displace or move the lead downwardly over roller 193 and into the previously positioned terminal 38. Thereafter the lead carrier is returned to its horizontal position by cam 112' and gear segment 104. It is desirable that the severed lead be gripped tightly during the stripping operation in order to prevent slippage of the lead from between the jaws as it is pulled relatively away from the severed insulation. However, it is desirable that the lead be somewhat less tightly gripped or held by the jaws during the inserting operation because, during this latter operation, the lead is urged downwardly relative to the jaws by the action of pawl 208. Advantageously, the contour of cam 204 provides a portion on its periphery which is slightly relieved and which contacts follower 202 shortly after the conclusion of the stripping operation so that the lower jaw will relax slightly its grip on the lead after the insulation is stripped. This relief is not apparent in the drawing inasmuch as the amount of relaxation of the grip on the lead is very slight. The requisite "drop off" on the cam periphery need, therefore, be only very slight.

During the return of the lead carrier from the vertical position to the horizontal position, the lower jaw is disengaged from the upper jaw to release the finished lead and an air stream is passed through air line 41 into ejector tube 40 to eject the lead. Flow of air through this ejector tube is controlled by means of a suitable solenoid actuated valve (not specifically shown) which in turn is actuated by a cam controlled Microswitch located in the Microswitch housing shown in Figure 10A.

While the wire carrier and lead carrier are oscillated from the horizontal to the vertical position at substantially the same time, it is desirable to have the lead carrier return to the horizontal position slightly ahead of the wire carrier after the conclusion of the crimping operation in order to ensure that the lead carrier will be in its horizontal position to receive the wire as it is fed therethrough. To accomplish this, cam 112' is preferably fixed to shaft 74 in a position such that it will contact follower 108' slightly before cam 112 contacts follower 108.

It will be apparent from the foregoing brief description of the lead carrier that this member differs in several essential respects from the wire carrier 28. In the case of the wire carrier, the conductor 22 as fed therethrough does not have a terminal thereon since the terminal at the beginning of the cycle is crimped onto the end of the conductor which projects from the wire carrier. Since this is so it is not necessary in the case of wire carrier 28 to provide for an opening of the passage within the wire carrier big enough to accommodate the crimped terminal. The lead carrier 28, however, must permit the passage of the leading end of the conductor during the feeding operation which leading end has a terminal crimped thereon and it is for this purpose that the jaw structure 202 is provided. Also in the case of wire carrier 28, the conductor is locked to the wire carrier slide and cover and the slide and cover are moved downwardly as a single unit while nose 172 is depressed to expose a portion of the end of the wire which portion is inserted into the terminal. In the case of the lead carrier, the actual insertion operation is effected by displacement of the lead relative to the carrier when pawl 208 is displaced downwardly.

*The wire cutting and insulation severing mechanism*

Referring now to Figures 12, 25, 26, and 27, the insulation cutting and wire severing blades 32, 33 are mounted on suitable pins 35 provided in the adjacent ends of each of a pair of opposed reciprocable blocks 240, 240'. As best shown in Figure 26, washers 35' are interposed between the blades and function as spacers. Block 240' is secured by means of suitable fasteners to a slide member 242 which is reciprocable between a pair of depending plates 246 secured by means of fasteners 260 to top plate 18 of the machine frame. The plates 246 are maintained in spaced apart relationship by means of a spacer bar 243 which is secured in position between the plates by means of fastener 245. The spacer bar extends to a position above the severing zone (i.e. the zone in which the blades 32, 33 are brought into coincidence) and mounts on its end spacer plates 248 which extend downwardly into the severing zone. These spacer plates function to guide the pairs of blades 33, 33 into proper relationship with each other as shown in Figures 26, 27 to effect cutting of the insulation and severing of the lead. The opposed faces of plates 246 provide guideways which receive complementary projections on slide member 242 and the slide member is secured at its opposite end by means of fasteners 247 to a pair of plates 244 between which is mounted a cam follower 274. Adjacent to top plate 18 these plates 244 are secured by fasteners 249 to a rack bar 251 which extends between plates 246 and for a substantial distance beyond the cutting and severing blades. At its opposite end this rack bar is engaged by the teeth of a gear 264 mounted for free rotation on a stub shaft 266 between a pair of plates 250 somewhat similar to the plates 246. These plates, like the plates 246, are secured by fasteners 260 to top plate 18. It should be emphasized at this point that the rack bar 246 is reciprocable back and forth along the underside of plate 18 and that it is not secured to the machine frame.

Gear 264 meshes with a smaller rack bar 254 to which is secured a slide 255 on its under side by means of fasteners 257. This slide and rack are reciprocable between plates 250 on suitable guide members provided therein and the left-hand end of rack bar 254, as viewed in Figure 25, is secured by means of suitable fasteners to block 240, which, as mentioned above, carries one of the sets of insulation cutting and wire severing blades. A spring 268 is connected at one end to a pin 270 on rack bar 251 and is anchored at the opposite end to a pin 272 extending between and secured to the depending plates 246. This spring will normally bias rack bar 251 to the left from the position shown in Figure 25, however, the rack bar can be moved to the position shown in Figure 25 against the contractile tendency of the spring to effect closure of the blades 32, 33.

The reciprocation of rack bar 251 is effected by means of a bell crank 276, mounted on a stub shaft 278 carried by a support 279. A first arm 280 which engages cam follower 274 and the other arm 282 of the bell crank provides a cam follower 284 on the end thereof which cam follower is engaged by a cam 285 mounted on shaft 60 for rotation therewith.

From the foregoing description it will be apparent that closure of the insulation stripping and wire severing blades is effected as cam 285 causes bell crank 276 to oscillate about shaft 278 thereby forcing cam follower 274 from its normal position (which is to the left of the position shown in Figure 25) to the position shown in Figure 25. As the cam follower is moved in this direction, the left-hand set of insulation cutting and wire severing blades carried by block 240' are moved rightwardly toward the axis of the wire. At the same time, the rack bar 251 is also moved rightwardly causing clockwise rotation of gear 264 which in turn causes leftward movement of rack bar 254 and its associated block 240.

It will be noted that two parallel sets of wire severing blades 33 are provided in the disclosed embodiment and upon closure of these blades as they move into registry with each other, a small segment of wire is removed from between the closed blades. It will be apparent that a single set of wire severing blades can be substituted for the two sets shown. However, the disclosed arrangement has been found to be advantageous for the reason that it is frequently desirable to change the amount of insulation stripped from the end of the wire. In the disclosed embodiment such adjustments can be made by merely changing the positions of the blades 33 (i.e. each blade or set of blades is moved towards or away from the other set by interposing suitable spacers).

After the wire has been severed and the insulation has been circumferentially cut upon closure of blades 32, 33 a small section of wire will remain between the blades and after the stripping operation is effected, a section of insulation will be left within and between the insulation cutting blades. These should be removed prior to the next operating cycle of the apparatus and in the disclosed embodiment there are provided suitable air lines 288 adapted to direct an air stream against the severed wire section and removed insulation during a portion of the operating cycle. Flow of air through lines is controlled by means of a suitable solenoid valve (not specifically shown) which, in turn, is actuated by a Microswitch located in the Microswitch housing shown in Figure 10A. The Microswitches in this housing are cam operated by means of cams mounted on shaft 60.

The stripping operation is effected during the portion of the cycle when the wire carrier and lead carrier are swung from the horizontal aligned positions of Figure 1 to the vertical positions of Figure 7. During the initial part of this portion of the cycle, the end of the wire and lead are pulled downwardly out of the segments of insulation which were previously cut by blades 32. The stripped end of the conducting core of the wire and lead are bent during this stripping operation so that these stripped ends will extend nearly normally of the ones of the wire and lead as shown best in Figure 5.

*The crimping mechanism*

As previously mentioned, the disclosed embodiment of the invention provides a pair of side-by-side crimping mechanisms 44, which, as shown in Figures 1 through 8, are located beneath the wire carrier and the lead carrier respectively. Each crimping mechanism is reciprocable along a path defined by rails or guides 314 from its "back" position, at which it receives an uncrimped terminal, to its "forward" position, where the stripped conductor ends are inserted and the terminals are crimped. Terminals are fed to the crimping mechanisms, open end up, by gravity through feed tubes 48, 48' from vibratory type terminal feeding mechanisms 49, 49' mounted on a support 51. Terminal feeding mechanisms 49, 49' are substantially similar to the vibratory type feeding mechanism shown in the copending application of Carl H. Bucher et al., Serial Number 579,937, filed April 23, 1956, for Feeding and Crimping Method and Apparatus, and need not be described in detail here. It is sufficient to say that vibratory feeders of this type are capable of delivering, from a batch supply of loose piece terminals, a succession of terminals open end first to a feed tube as shown at 48, 48'. Since the crimping mechanisms are substantially alike a description of one will suffice for both. In the drawing the same reference numerals are used for corresponding parts of the two crimping mechanisms.

Turning now to Figures 28 through 33, the terminals are crimped by means of a pair of generally triangular die blocks 290, 293 which are normally spaced apart, as shown in Figure 30, but which can be moved towards each other into abutting relationship as shown in Figure 29. The faces 291 of these die blocks, which abut each other when the die blocks are in their closed position, each provides a generally semi-cylindrical groove 295, 297 so that when the die blocks are closed a cavity is defined, which cavity receives and positions accurately the terminal being crimped or indented. Grooves 295, 297 provide central depressions 295a, 297a respectively from which passages 296 extend radially in each die block, and are counterbored as indicated at 298 to receive the enlarged end 302 of an indentor 300 (Figure 31) having an indenting end of reduced size 301. A spring 304 positioned in surrounding relationship to the central portion of each indentor 300 normally biases the indentors away from the grooves 295, 297. However, the indentors can be driven radially inwardly to the positions shown in Figure 29 for the purpose of crimping the terminal onto the wire or lead.

Die block 290 is carried within a cut-out portion of the top surface of a reciprocable carrier member 306 which cut-out portion is grooved at 323 for the accommodation of a pin 322 which depends from the under side of the die block. It will be noted from Figure 32 that groove 323 is somewhat oversize so that limited motion of die block 290 is permitted relative to carrier member 306. A camming block 292 is also adjustably mounted on the top surface of carrier member 306 and provides camming surfaces 301 which are adapted to engage enlarged heads 302 of the indentors and drive them radially toward the terminal during the crimping operation. Adjustment of camming member 292 relative to carrier 306 is achieved by means of adjusting screws 316 which extend through slots 315 in the camming member and which are threadedly received in the carrier member. An adjustable stop 318 is clamped to carrier 306 by means of a screw 307 which extends through a slot 305 in the wedge member. This adjustable wedge or stop functions to ensure against leftward movement of camming block 292 (as viewed in Figure 32) from any given position of adjustment. Fastener 307 also secures in place a strip 317 which extends over the top surface of camming block 292 and over at least a portion of the top surface of die block 290. The lower end of terminal feed tube 58 is located adjacent strip 317 and the strip supports the leading terminal in tube 48. Lock plates 319 are provided on each side of carrier member 306, which lock plates retain camming block 292 in its position on the top surface of carrier member 306.

The carrier member is bifurcated at the opposite end from die block 290 and accommodates on a suitable stub shaft a cam follower 308, which cam follower contacts a cam 310 mounted on main power shaft 60. As is explained below, the entire carrier member and crimping mechanism are normally biased to a position such that the die blocks are beneath the terminal feed tube 48; however, the crimping mechanism is urged to its "forward" position during a portion of the cycle by the action of the cam 310. A lobe 312 is provided on this cam for effecting the final crimping action, as is also explained below in more detail.

Carrier member 306 is yieldingly linked by means of a rod 330 to a second carrier member 326 upon which crimping die 293 and the camming mechanism therefor are mounted. As shown best in Figure 33, rod 330 is threadedly secured to carrier member 306 and extends through a passage 332 in carrier member 326 which passage is counterbored at each end. This rod provides a stop 333 which is received within one of the counterbores of the passage. A spring 334 is positioned in surrounding relationship to rod 330 and is received within the other counterbore of passage 332 and within a similar counterbore in carrier 306 so that the two carrier members can be moved against each other into abutting relationship against the force of spring 334.

Die block 293 is fixedly secured to carrier 326 by means of suitable fasteners as indicated at 327 and a camming block 336 is slidably mounted on the top surface of carrier 326 for the purpose of driving indentors 300 through the passages in die block 293 when the terminal is crimped. The extent of sliding movement of camming block 336 is limited by means of a pin 338 which extends into a slot 339 in the camming block.

The left-hand portion of carrier 326 as viewed in Figure 32, provides a sloping channel 325 which functions as a guide path for the terminal after crimping as it is swung from between the die blocks. It should be noted that the right-hand and left-hand crimping mechanisms, as viewed in Figure 28, differ in the respect that these channels face each other. Rails 314 are notched as indicated in Figure 28 at 314a so that the terminal after crimping onto the end of the wire and lead can be swung out from between the crimping die blocks.

A removable stop 340 is provided on a rod 342 reciprocable in bearings 346 mounted on base plate 14; normally, rod 342 is biased to the position shown in Figure 28 by means of springs 348 which encircle the rod and which bear against pins 350 integral with the rod. In the normal position of Figure 28, the stops are disposed within and on the line of travel of the carriers 306, 326 so that as the crimping mechanism moves to its "forward" position, carrier 326 comes to rest when it contacts stop 340. Rod 342 is pivoted at 352 to the piston rod 354 of the piston-cylinder 356, which is connected by means of an air line 358 to a suitable source of compressed air (not shown). Operation of the piston-cylinder 356 is controlled by means of a valve controlled by solenoid 360 which in turn is controlled by a cam actuated microswitch located in the microswitch housing shown in Figure 10A. In operation, during a portion of the operating cycle and after the terminals are crimped onto the ends of the wire and lead, piston-cylinder 356 is actuated to move rod 342 rightwardly, as viewed in Figure 28, thereby removing stops 340 from their positions of Figure 28. This permits opening up of the die blocks under the force of springs 334 for the removal of the crimped terminals.

Camming block 336 is actuated by means of a plate 362 which is slidably retained on the top of bearing 346 between a pair of retaining blocks 364. A portion of this plate extends beyond the bearing 346 and provides an opening 366 which receives the end of a rocker arm 368 pivoted at its opposite end at 370 to the bifurcated end of a reciprocable rod 372. As clearly shown in Figure 32, rocker arm 368 extends downwardly through a suitable oversized opening in base plate 14. A bracket 374 is provided on the underside of base plate 14, which bracket provides an opening through which rod 372 extends. Rod 372 is normally biased in the position shown in Figure 32 by means of helical spring 375 which surrounds the rod and which bears at one end against bracket 374 and at the opposite end against a washer retained by a stop nut 376 threadedly secured onto the end of the rod. It will be apparent from the foregoing description, that if rod 372 is moved rightwardly in Figure 32, rocker arm 368 is rocked in such manner as to cause leftward movement of plate 362, thereby driving camming block 336 into engagement with the indentors in die block 293.

An arm 382 depends from carrier 306 downwardly through an opening in plate 14 and provides on its lower end an adjustable stop 386 having an enlarged head 388 adapted to contact head 376 of rod 372. Adjustment of stop 386 is achieved by virtue of its threaded connection with depending arm 382 and a lock nut 388 by means of which the stop is securely locked in the desired position.

As previously mentioned, the crimping mechanism is normally biased in its "back" position. This normal biasing of the crimping mechanism is achieved by means of a coil spring 384 which is anchored at one end to depending arm 382 of carrier 306 by means of a bracket 385 and which is secured at its opposite end to a suitable bracket which depends from base plate 14 of the frame of the machine (the left-hand end of this spring being omitted from the drawing of Figure 32 in the interest of clarity).

Before proceeding with a description of the operation of the crimping mechanism, it should be mentioned that the parts are shown in Figure 28 in the position they occupy at the precise instant of crimping. It will be noted that in Figure 28 the die blocks 290, 293 are against each other and are seated snugly within their respective crimping blocks 336, 292 and further, that the stops 340 are in their normal positions behind carrier members 326. In Figure 32, the parts are shown in the positions they occupy immediately after crimping. In this figure, it will be noted that the die blocks 290, 293 are spaced apart a distance sufficient to permit the crimped terminal to be swung outwardly from between the die blocks. Also, in Figure 32 the stop 340 is withdrawn from its normal position to permit some rightward movement of carrier member 326 as will be apparent from the description of the operation which follows.

At the beginning of the operating cycle, the crimping mechanisms are in their "back" position and the space separating the die blocks 290, 293 is disposed beneath the tube 48 which accommodates a succession of terminals from the terminal source 49. While the crimping mechanisms are in this position, a terminal drops downwardly into the space separating the die blocks. To this end, the die blocks should normally be separated a distance sufficient to receive the terminal with ease and at the same time the die blocks should be spaced relatively closely so that the terminal will be supported against falling. At the beginning of the cycle, carrier members 326 are biased away from the carrier members 306 by virtue of the action of springs 334. Die blocks 290, 293 are biased away from camming blocks 292, 336 by virtue of the force of the springs 304 which surround each of the indentors 300. Cams 310 are not in the position shown in Figure 11 but are rotated approximately 180° from this position so that spring 384 is permitted to maintain the crimping mechanisms in their back position.

As the operating cycle proceeds, the crimping mechanisms are shifted from their back position to their "front" position by the action of cam 310. During this interval, the die blocks 290, 293 are maintained in spaced apart relationship by the action of spring 334. "Forward" motion of the crimping mechanism continued until carrier member 326 abuts stop members 340. Thereafter, carrier member 306 is moved a further distance forwardly relative to carrier member 326 against the compression of springs 334 in order to bring die blocks 290, 293 against each other in order accurately to position the terminal for the wire inserting step. It is to be noted that the springs 304 on the several indentors must be sufficiently stiff that they will maintain the die blocks and their respective camming blocks spaced apart from each other as the spring 334 is compressed, and as carrier member 306 is moved relatively towards carrier member 326 during this portion of the cycle.

Adjustable stop member 386 is of such length that as the die blocks 290, 293 are brought into abutting relationship with each other by movement of carrier 306 relatively towards carrier 326, stop 386 contacts the enlarged head 376 of rod 372. When the parts are in this condition, with the blocks against each other and with stop 386 contacting stop 376, the wire and lead are inserted, as previously explained, into the terminals. Immediately thereafter, lobe 312 of cam 310 contacts follower 308 and imparts a final motion to the carriers which causes final crimping of the terminal. During this brief instant, carrier member 306 is moved relatively a very short distance towards carrier member 326. However, die block 290, since it is already abutting die block 293, cannot move with carrier member 306, and as a result the carrier member and its associated camming member 292 are moved rightwardly relative to die block 290 and the indentors 300 which are carried within die block 290 are driven radially inwardly toward the terminal against the compression of springs 304 to cause indentation of the portion of the terminal. At the same time, this rightward movement of carrier 306 causes rightward movement of rod 372 an equal distance since, as noted above, the stop 386 was previously brought into engagement with the head 376 of rod 372. As a result of this movement of rod 372 to the right, as viewed in Figure 32, plate 362 is moved leftwardly by the action of rocker arm 368. This causes camming block 336 to move a corresponding distance to the left and drive the indentors 300 which are carried within die block 293 radially towards the terminal to provide additional indentations on the terminal surface. At the conclusion of this final rightward movement of the parts, the terminal will be fully crimped by the provision of a plurality of circumferentially spaced radially extending indentations on its external surface.

After the crimping operation is completed, it is necessary to open partially the die blocks in order to permit the terminals to be swung from between the two die blocks of the crimping mechanism. This is accomplished by rightward movement (as viewed in Figure 28) of rod 342 which results in the withdrawal of stops 340 from their position of Figure 28. When the stops are withdrawn, as shown in Figure 32, limited rightward movement of carrier member 326 is permitted, although carrier member 306 will not move rightwardly because of the action of springs 334. Advantageously cam 310 is contoured along its camming edge such that slight leftward movement of carrier 306 takes place during this interval. As a result of this movement of the carriers, die blocks 290, 293 are separated a distance which is sufficient for the terminals to be swung outwardly from the crimping mechanism. As soon as the terminals clear the crimping mechanism, and cam 310 continues to rotate, the crimping mechanisms are withdrawn from their "forward" position to their "back" position beneath terminal feed tubes 48, for the next cycle of operation.

As previously mentioned, adjustment of the extent to which the terminals are indented can be achieved by virtue of the wedge member 318. As is apparent from Figure 28, leftward movement of this wedge from the position shown will limit the extent to which the indentors are driven into the terminals. Corresponding adjustment is achieved for the indentors carried by die block 293 by means of adjustable stop member 386.

The extent to which rod 372 is moved rightwardly in Figure 32 can readily be adjusted by changing the position of stop 386 so that it contacts the enlarged head 376 on the rod for a shorter or longer period during the final rightward movement of carrier 306.

From the foregoing description it will be apparent that the instant invention provides an apparatus for automatically producing leads having the insulation stripped from each end thereof and having a terminal of the closed barrel type crimped onto the stripped ends. It is to be understood that the invention is not limited to the particular embodiment herein disclosed but is limited only by the scope of the appended claims when viewed in their proper perspective against the prior art.

We claim:

1. In an apparatus for making electrical leads, the improvement comprising a pair of normally aligned conductor carriers, conductor severing means comprising closable severing blades positioned between said conductor carriers, wire feeding means for feeding a predetermined length of wire through said carriers and between said severing blades, and a pair of crimping mechanisms positioned remote from said severing means, each of said carriers being mounted for rotary movement from their normally aligned positions to positions adjacent one of said crimping mechanisms whereby upon closure of said severing blades a lead is severed from fed wire, and said lead and the end portion of said wire are moved, upon movement of said carriers to position the trailing end of said lead and the leading end of said wire each adjacent one of said crimping mechanisms.

2. Apparatus as set forth in claim 1 including insulation cutting means for circumferentially cutting insulation adjacent the trailing end of said lead and the leading end of said wire, said insulation cutting means being disposed on each side of said wire severing blades and being operative to retain severed segments of insulation as said wire and lead are moved thereby to strip said severed segments of insulation from the trailing end of said lead and from the leading end of said wire.

3. Apparatus as set forth in claim 1 wherein each of said carriers incorporates inserting means for axially moving said lead and the end portion of said wire thereby to insert the trailing end and leading end of said lead and wire into terminals positioned within said crimping mechanism.

4. Apparatus as set forth in claim 1 wherein each of said conductor carriers incorporates releasable locking means for locking said lead and said wire relative to their respective conductor carriers.

5. In an apparatus for making electrical leads, the improvement comprising a pair of normally aligned conductor carriers, conductor severing means comprising closable severing blades positioned between said carriers, insulation cutting means comprising closable knives positioned on each side of said severing means, wire feeding means for intermittently feeding a predetermined length of wire through said carriers along a path between said severing blades and between said cutting knives, a pair of crimping mechanisms positioned remote from said severing means, and means for moving each of said carriers from aligned positions to a position adjacent one of said crimping mechanisms, each of said carriers incorporating releasable conductor locking means and conductor moving means, means for actuating said locking means after feeding of said wire whereby upon closure of said severing blades and cutting knives a lead is severed from the end of said conductor and insulation adjacent the trailing end of the lead and the leading end of the wire is circumferentially cut, and upon movement of said carriers severed sections of insulation are stripped from the trailing end of the lead and from the leading end of the wire respectively and said trailing end and leading end are positioned each adjacent one of said crimping mechanisms, and means for actuating said conductor moving means in said carriers after movement thereof whereby, the stripped trailing end of said lead and the stripped leading end of said wire are inserted into terminals positioned in said crimping mechanisms.

6. In a lead making machine and in combination with a terminal crimping station, conductor feeding means, a rotatably mounted conductor carrier having a longitudinal passage therein for the accommodation of a section of fed electrical conductor, said carrier incorporating releasable locking mechanism for locking said conductor to said carrier after feeding thereof, means for rotating said carreir to position said conductor at said terminal crimping station, and said carrier providing means for axially moving said conductor to insert the end of said conductor into a terminal positioned at said terminal crimping station.

7. Apparatus as set forth in claim 6 wherein said locking mechanism comprises a jaw and means for closing said jaw after feeding of said conductor.

8. Apparatus as set forth in claim 6 wherein said means for axially moving said conductor comprises reciprocable shoe means in frictional engagement with said conductor whereby upon movement of said shoe means, said conductor is axially moved to insert the end of said conductor.

9. In a lead making machine and in combination with conductor feeding means, a rotatably mounted conductor carrier having a longitudinal passage therein for the accommodation of a section of fed electrical conductor, said carrier providing a jaw member closable to lock said conductor within said carrier, means for rotating said carrier to a terminal crimping station, and reciprocable shoe means within said carrier and in frictional engagement with said conductor for moving said conductor axially thereby to insert said conductor into a terminal positioned at said crimping station.

10. A device as set forth in claim 6 where said carrier comprises a base member mounted for rotation on a shaft, a slide member carrier by said base member for sliding movement in a direction extending normally of said shaft, said passage extending through said slide member, said locking mechanism comprising means for pressing said conductor against said slide member, and wherein said means for axially moving said conductor comprises means for moving said slide member relative to said base member.

11. In an apparatus for making electrical leads, the improvement comprising, a pair of normally aligned conductor carriers, conductor severing means comprising closable severing blades positioned between said conductor carriers, wire feeding means for feeding a predetermined length of wire through said carriers between said severing blades, and a pair of crimping mechanisms positioned remote from said severing means, said crimping mechanisms being reciprocable between crimping stations and terminal receiving stations, means for feeding a succession of terminals to said terminal receiving stations for reception by said crimping mechanisms, each of said carriers being mounted for rotary movement from their normally aligned positions to positions adjacent one of said crimping stations, and means for actuating said wire feeding means and said severing means thereby to sever a lead from the end of a fed length of wire, said lead being within one of said carriers and said wire being within the other of said carriers, means for rotating said carriers from their aligned positions to positions adjacent said crimping stations and for reciprocating said crimping mechanisms from said terminal receiving stations to said crimping stations, and means for actuating said crimping mechanisms wheerby terminals are crimped onto the trailing end of said lead and the leading end of said wire.

(References on following page)

References Cited in the file of this patent

UNITED STATES PATENTS

| | | |
|---|---|---|
| 2,225,739 | Elliott | Dec. 24, 1940 |
| 2,259,742 | Edison | Oct. 21, 1941 |
| 2,290,673 | Cole | July 21, 1942 |
| 2,340,360 | Alden | Feb. 1, 1944 |
| 2,340,448 | Andren | Feb. 1, 1944 |
| 2,438,023 | Sirp | Mar. 16, 1948 |
| 2,497,112 | Andren | Feb. 14, 1950 |
| 2,545,756 | Andren | Mar. 20, 1951 |
| 2,601,462 | Streader | June 24, 1952 |
| 2,645,959 | Fuchs | July 21, 1953 |
| 2,688,133 | Berg | Sept. 7, 1054 |
| 2,725,615 | Edwards | Dec. 6, 1955 |
| 2,764,237 | Adams | Sept. 25, 1956 |
| 2,768,425 | Andren | Oct. 30, 1956 |
| 2,774,130 | Folkenroth | Dec. 18, 1956 |

FOREIGN PATENTS

| | | |
|---|---|---|
| 565,605 | Germany | Nov. 17, 1932 |